(12) United States Patent
Fujiwara et al.

(10) Patent No.: US 6,568,689 B1
(45) Date of Patent: May 27, 2003

(54) GLAND PACKING

(75) Inventors: Masaru Fujiwara, Sanda (JP); Takahisa Ueda, Sanda (JP)

(73) Assignee: Nippon Pillar Packaging Co., Ltd., Osaka (JP)

( * ) Notice: Subject to any disclaimer, the term of this patent is extended or adjusted under 35 U.S.C. 154(b) by 0 days.

(21) Appl. No.: 09/926,014

(22) PCT Filed: Dec. 25, 2000

(86) PCT No.: PCT/JP00/09177

§ 371 (c)(1), (2), (4) Date: Aug. 14, 2001

(87) PCT Pub. No.: WO01/48403

PCT Pub. Date: Jul. 5, 2001

(30) Foreign Application Priority Data

Dec. 27, 1999 (JP) .......................................... 11-369911

(51) Int. Cl.[7] .............................................. F16J 15/18
(52) U.S. Cl. ........................ 277/529; 277/536; 277/530; 277/534; 277/537; 277/539
(58) Field of Search ................................. 277/633, 230

(56) References Cited

U.S. PATENT DOCUMENTS 5,370,405 A  * 12/1994 Ueda .......................... 277/230
5,605,341 A  *  2/1997 Ueda .......................... 277/204
6,299,976 B1 * 10/2000 Tsukamoto .................. 428/364

FOREIGN PATENT DOCUMENTS

JP         6-279752        10/1994

* cited by examiner

Primary Examiner—Anthony Knight
Assistant Examiner—Lisa Bannapradist
(74) Attorney, Agent, or Firm—Jones, Tullar & Cooper, P.C.

(57) ABSTRACT

The present invention provides a gland packing in which impairment of the sealing performance due to cracks that unwillingly occur in an end portion in the width direction of an expanded graphite tape of a braiding yarn in the gland packing can be suppressed. In gland packings 1, 2, braiding yarns include braiding yarns 10A in each of which an expanded graphite tape 30 is bent so as to contract in the width direction, and both end portions 31 in the width direction of the bent expanded graphite tape 30 are folded back, or braiding yarns 20A in each of which at least an outer end portion 31' in the width direction of a twisted expanded graphite tape 30 is folded back.

4 Claims, 16 Drawing Sheets

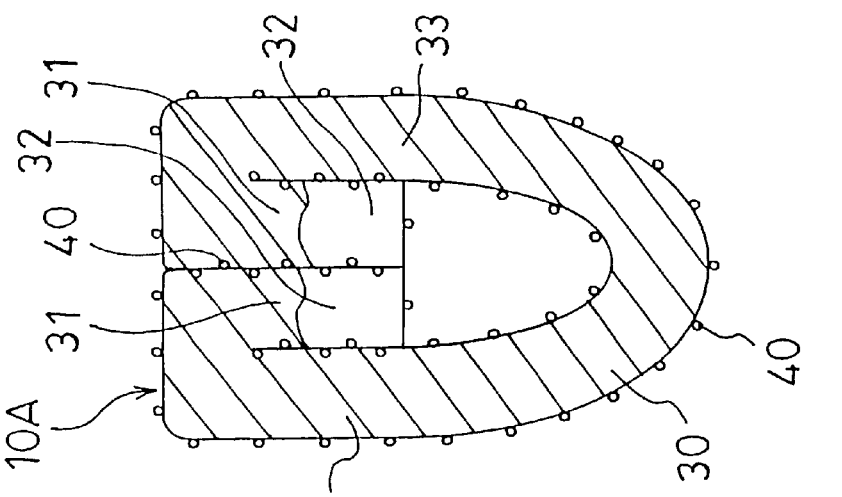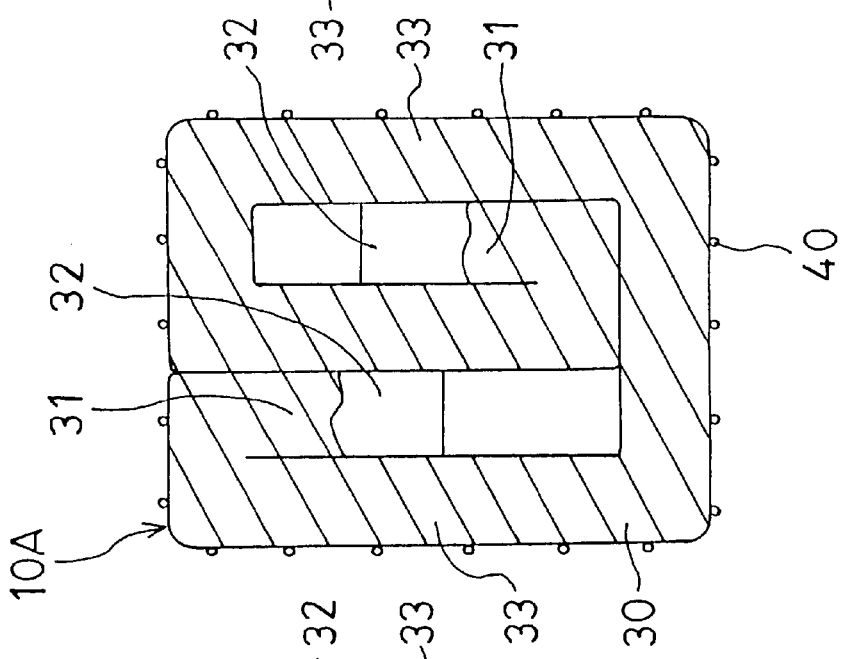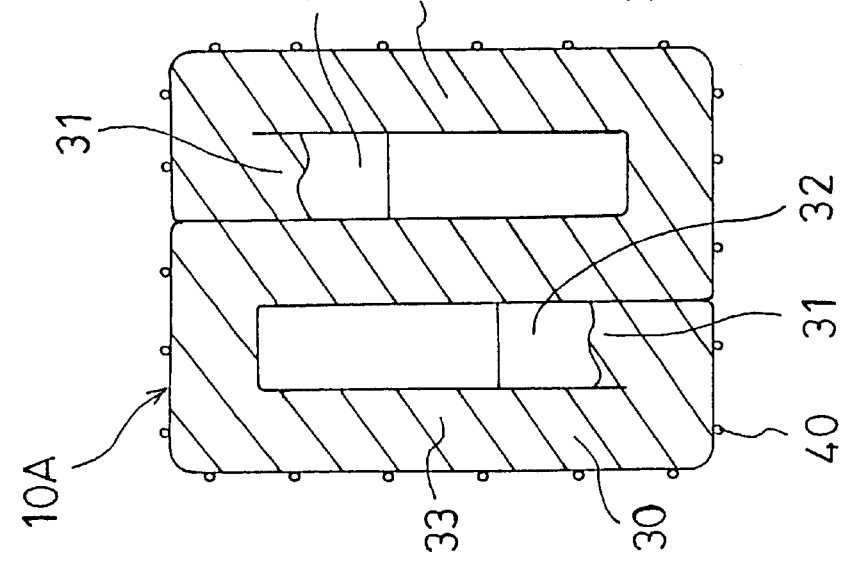

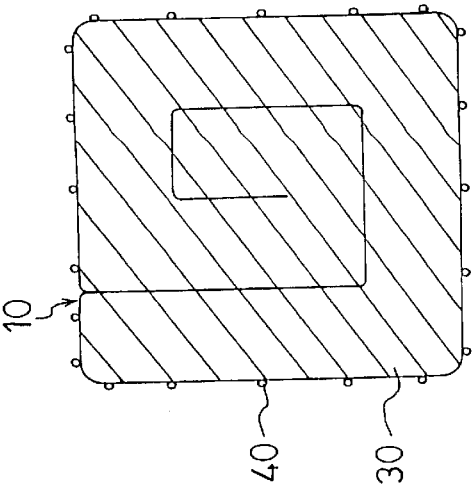
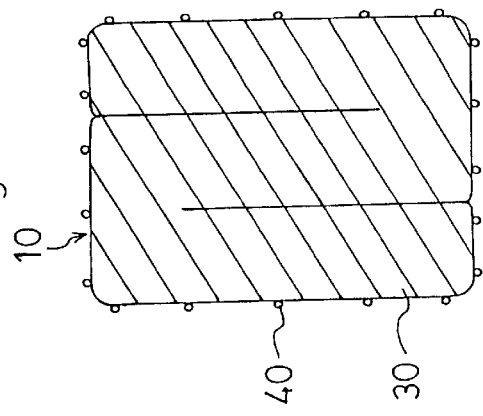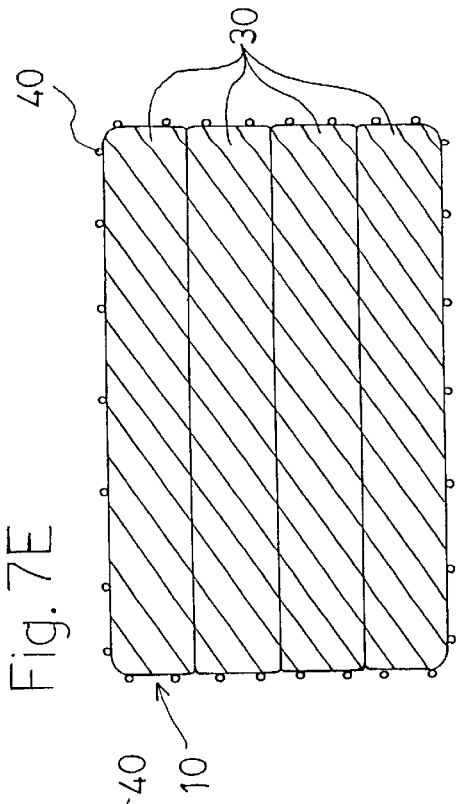
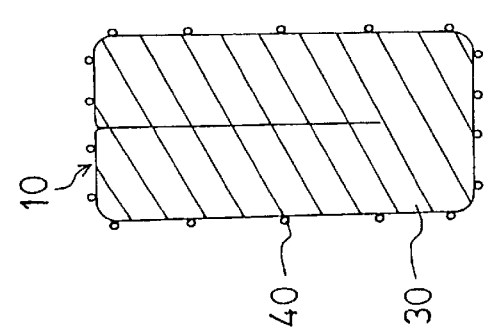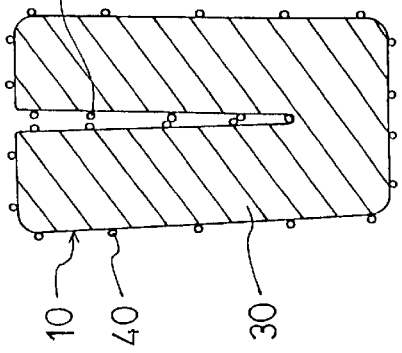

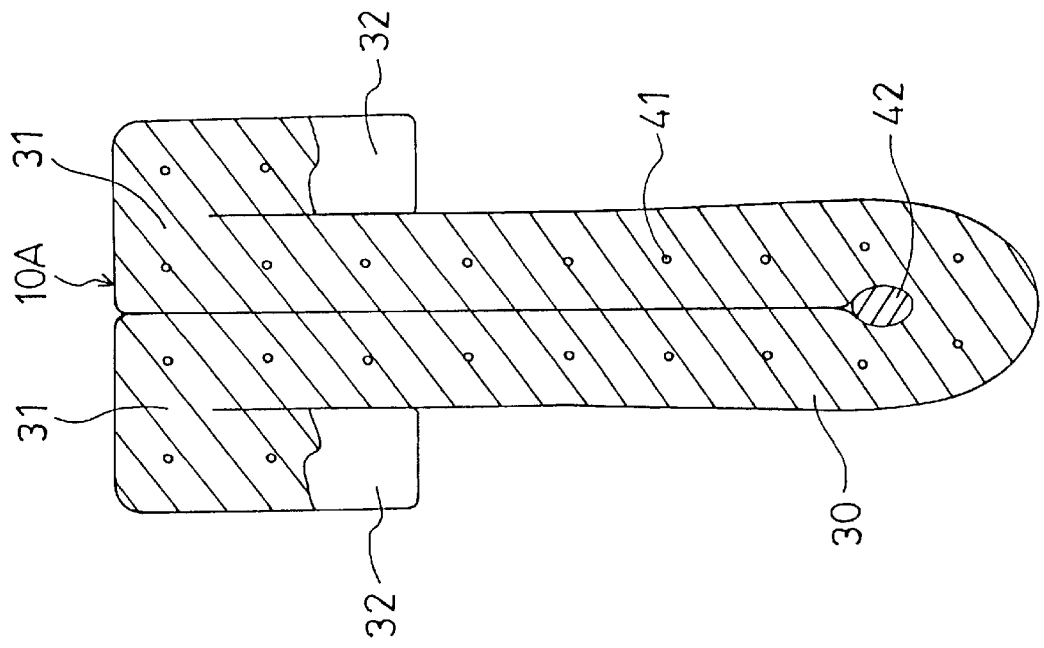
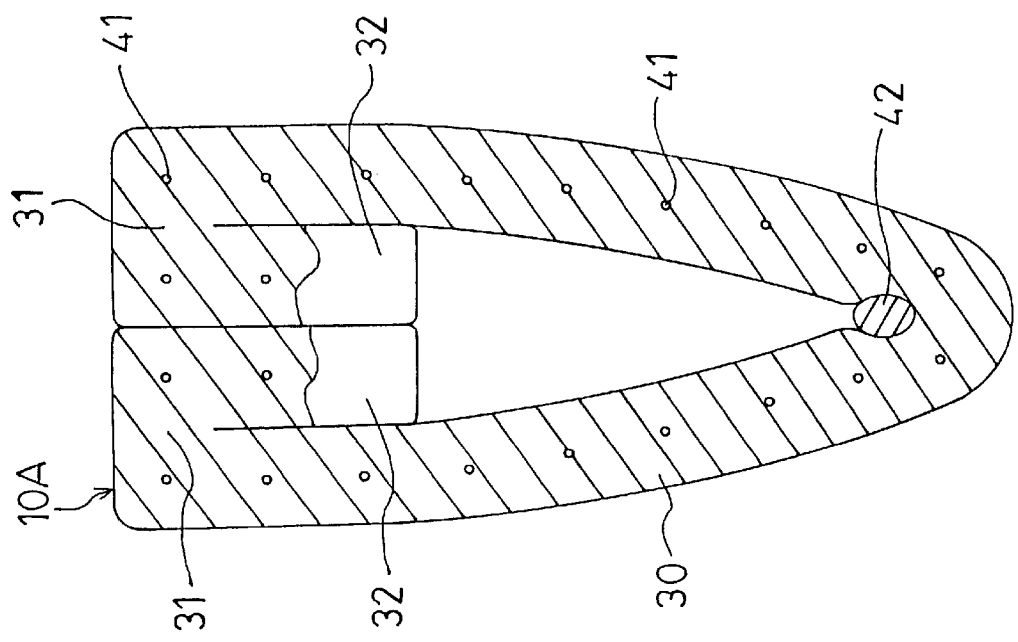

GLAND PACKING

TECHNICAL FIELD

The present invention relates to a gland packing which is to be used in a shaft seal portion of a fluid apparatus or the like.

BACKGROUND ART

Conventionally, as plural braiding yarns in a braided gland packing, for example, known are braiding yarns which are disclosed in, for example, Japanese Patent Publication No. 6-27546 and Japanese Patent Application Laying-Open No. 6-74346. In each of the braiding yarns, an expanded graphite tape is bent so as to contract in the width direction, the whole outer periphery of the bent expanded graphite tape is covered by a reinforcing member configured by a knitted body or a braided body.

An expanded graphite tape is easily affected by tension or torsion. In a braiding yarn of a gland packing, therefore, cracks (breaks) sometimes unwillingly occur in end portions in the width direction of an expanded graphite tape. As such cracks are larger in number and in size, and as the number of braiding yarns in which such cracks occur is larger, the sealing performance of the gland packing is further impaired.

Even in the case where such cracks do not exist immediately after the production of a gland packing, cracks sometimes occur when, after the production, the gland packing is compression-molded to a predetermined size or into an annular shape. In the case where a gland packing is set to an apparatus so as to function as a seal, when a large fastening force is applied to the packing, such cracks may occur. When such cracks occur immediately after the production of a gland packing, a situation that the cracks are expanded by the compression molding or the fastening force is of course caused.

SUMMARY OF THE INVENTION

The gland packing of the invention is configured so that, in a plurality of braiding yarns in a braided gland packing or a twisted gland packing, the braiding yarns include braiding yarns in each of which an expanded graphite tape is bent to contract in a width direction, and both end portions in the width direction of the bent expanded graphite tape are folded back.

DISCLOSURE OF INVENTION

The gland packing of the invention is configured so that, in a plurality of braiding yarns in a braided gland packing or a twisted gland packing, the braiding yarns include braiding yarns in each of which an expanded graphite tape is bent to contract in a width direction, and both end portions in the width direction of the bent expanded graphite tape are folded back.

According to the thus configured gland packing, the braiding yarns in a gland packing include braiding yarns in each of which an expanded graphite tape is bent to contract in a width direction, and both end portions in the width direction of the expanded graphite tape are folded back. Even when a crack occurs in an end portion in the width direction of the expanded graphite tape, therefore, either of the following states arises. In the case where the crack is large, there arises a state where the crack is broken to contract, and, in the case where the crack is small, there arises another state where the crack is opposed to an outer side piece portion of the bent expanded graphite tape. Therefore, the crack is not exposed in a state where the crack is straightly elongated as it is, so that impairment of the sealing performance of the gland packing can be suppressed.

In some cases, a gland packing is compression-molded to a predetermined size or into an annular shape after the production, or in the case where a gland packing is set to an apparatus so as to function as a seal, the gland packing receives a large fastening force. Also in such cases, when a gland packing comprises such braiding yarns, cracks hardly occur because the end portions in the width direction of an expanded graphite tape are folded back, and, when cracks already occur, it is possible to suppress expansion of the cracks.

As the number of such braiding yarns in a gland packing is larger, cracks in an end portion in the width direction of the expanded graphite tape exert less influence, and impairment of the sealing performance of the gland packing due to the cracks can be suppressed more effectively.

The other gland packing of the invention is configured so that, in a plurality of braiding yarns in a braided gland packing or a twisted gland packing, the braiding yarns include braiding yarns in each of which an expanded graphite tape is twisted, and at least an outer end portion in a width direction of the twisted expanded graphite tape is folded back.

According to the thus configured gland packing, the plural braiding yarns include braiding yarns in each of which at least an outer end portion in the width direction of a twisted expanded graphite tape is folded back. In the same manner as the gland packing having the above-mentioned configuration, even when a crack occurs in an outer end portion in the width direction of the expanded graphite tape, therefore, either of the following states arise. In the case where the crack is large, there arises a state where the crack is broken to contract, and, in the case where the crack is small, there arises another state where the crack is opposed to an outer side piece portion of the expanded graphite tape. Therefore, impairment of the sealing performance of the gland packing can be suppressed. The invention has another advantage that, even after the production, cracks hardly occurs in the outer end portion in the width direction of the expanded graphite tape in the same manner as the gland packing having the above-mentioned configuration. As the number of such braiding yarns in a gland packing is larger, impairment of the sealing performance of the gland packing due to cracks in the outer end portion of the expanded graphite tape can be suppressed more effectively.

BRIEF DESCRIPTION OF DRAWINGS

FIGS. 6A to 6C are section views showing other embodiments of a braiding yarn in the gland packing of the invention.

FIGS. 7A to 7E are section views showing a braiding yarn which is to be combined with braiding yarns in the gland packing of the invention.

FIGS. 9A and 9B are section views showing still further embodiments of a braiding yarn in the gland packing of the invention.

DETAILED DESCRIPTION OF THE PREFERRED EMBODIMENTS

Figure 1:
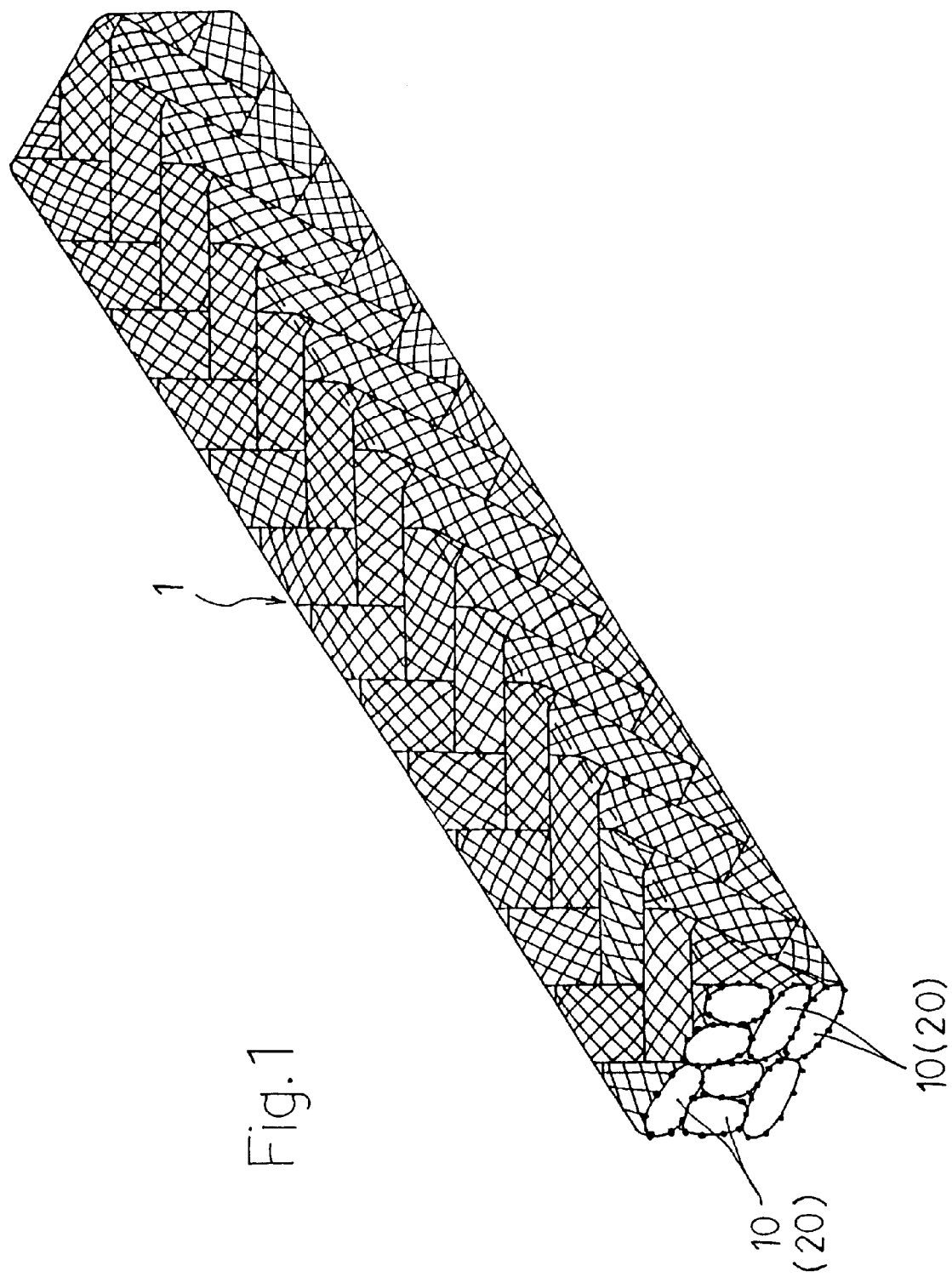
FIG. 1 is a schematic external perspective view showing an example of the mode of the braided gland packing of the invention.
Figure 2:
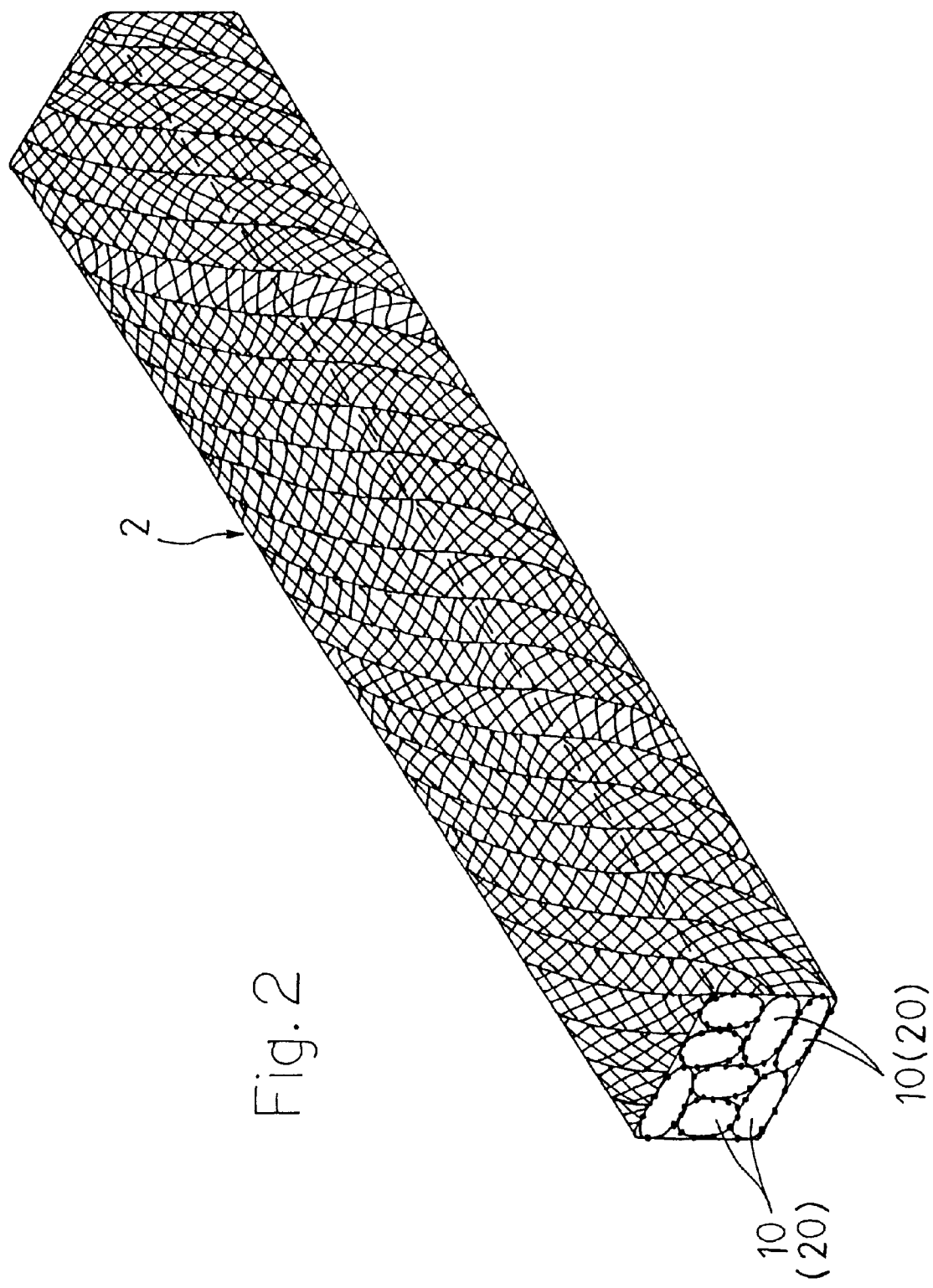
FIG. 2 is a schematic external perspective view showing an example of the mode of the twisted gland packing of the invention.

FIG. 1 is a schematic external perspective view of an example of the braided gland packing of the invention and FIG. 2 is a schematic external perspective view of an example of the twisted gland packing of the invention.

Figure 3:
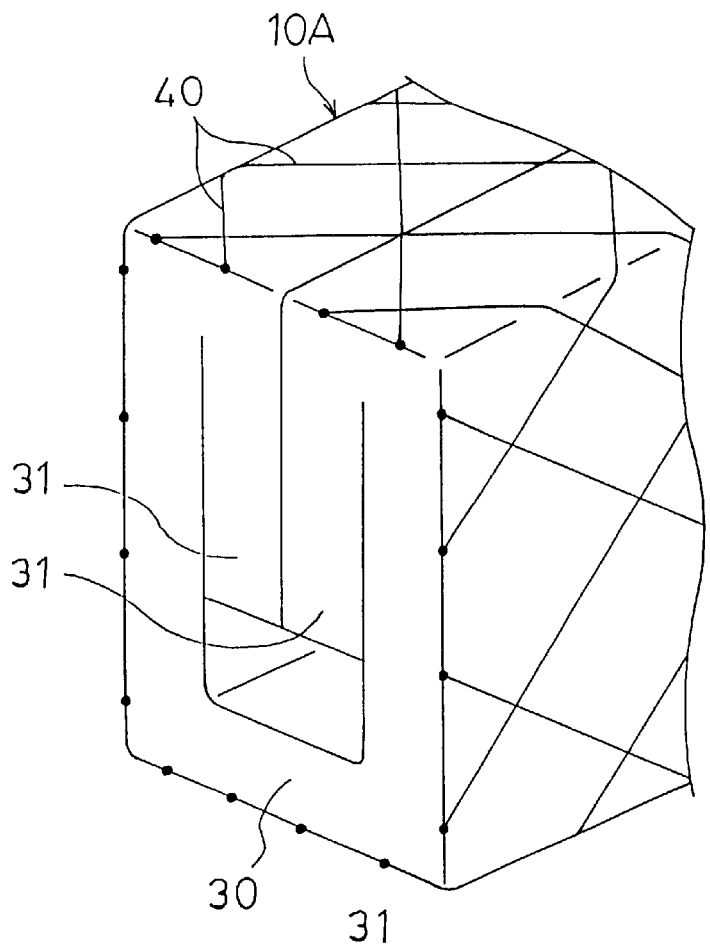
FIG. 3 is a partial enlarged perspective view showing a braiding yarn in the gland packing of the invention.

In the braided gland packing 1 and the twisted gland packing 2, at least one of, preferably a half or more of, and more preferably all of braiding yarns 10 constituting the packings are configured as braiding yarns 10A in each of which, as shown in FIG. 3, an expanded graphite tape 30 of a predetermined width is folded into a valley fold in the longitudinal direction so as to contract in the width direction, both the end portions 31, 31 in the width direction of the bent expanded graphite tape 30 are folded back so as to be directed inside the expanded graphite tape 30, and the whole outer periphery is covered by a reinforcing wire member 40 configured by a knitted body or a braided body.

As the reinforcing wire member 40 of the braiding yarns 10A, metal wires such as stainless steel, inconel, and monel, organic fibers such as cotton, rayon, phenol, aramid, PBO, PBI, PTFE, PPS, and PEEK, and inorganic fibers such as carbon fiber, and ceramic fiber can be suitably used.

In the gland packings 1, 2, with respect to the braiding yarns which are not configured as the braiding yarns 10A, adequate braiding yarns which use expanded graphite or an expanded graphite tape may be used. As shown in each of FIG. 7A, FIG. 7B, FIG. 7C, FIG. 7D, and FIG. 7E, for example, a braiding yarn in which the expanded graphite tape 30 of a predetermined width is bent so as to contract in the width direction, and the whole outer periphery of the bent expanded graphite tape 30 is covered by the reinforcing wire member 40 configured by a knitted body or a braided body is preferably used because the yarn is of the same type.

Figure 4:
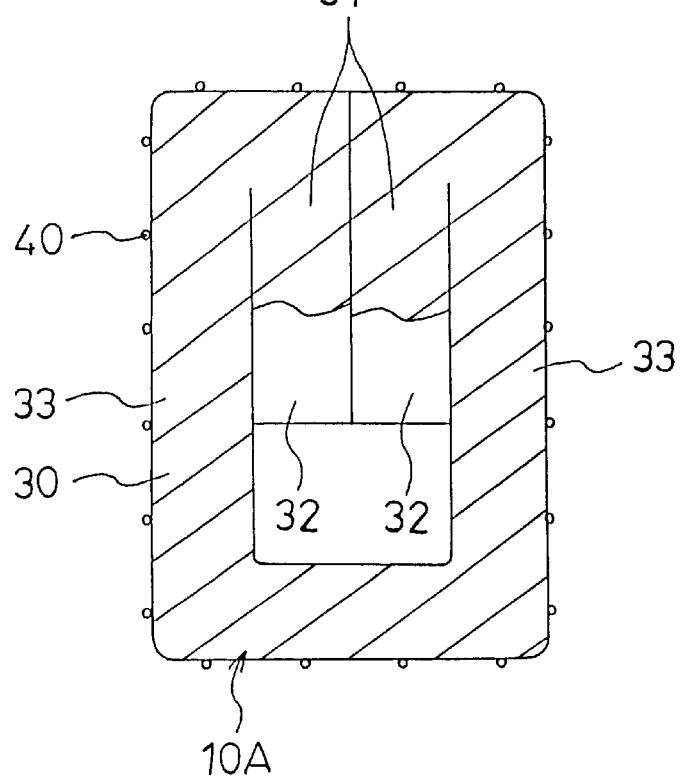
FIG. 4 is a section view of the braiding yarn of FIG. 3.
Figure 5:
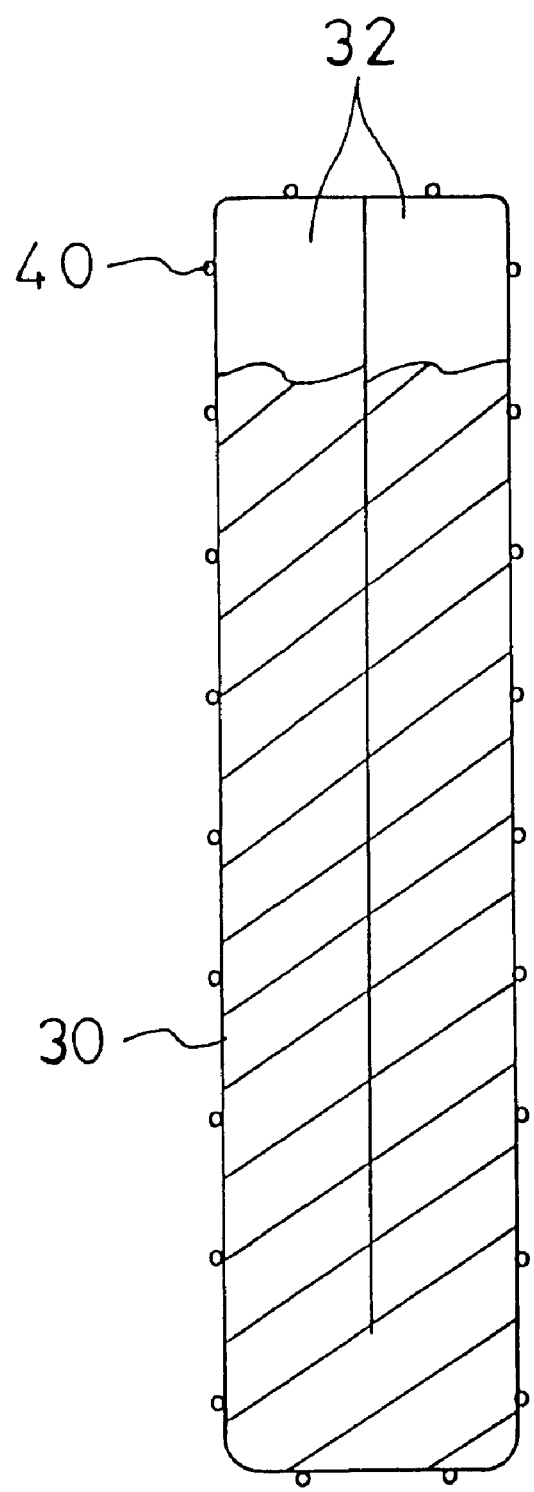
FIG. 5 is a section view of a braiding yarn of a comparative example.

In the case where such braiding yarns 10A are included in the braided gland packing 1 or the twisted gland packing 2, even when, as shown in FIG. 4, cracks 32, 32 occur in the end portions 31, 31 in the width direction of the expanded graphite tape 30, there arises a state where the cracks 32, 32 are in (inside) the outer side piece portions 33 of the bent expanded graphite tape 30 and are opposed to the outer side piece portions 33. As compared with the case where cracks 32, 32 are straightly exposed to the outside as shown in FIG. 5, impairment of the sealing performance of the gland packings 1, 2 can be suppressed.

Also in the case where cracks 32, 32 in the end portions 31, 31 of the expanded graphite tape 30 are so large that the cracks are passed through the end portions 31, 31 to reach the outer side piece portions 33, the cracks 32, 32 are broken into, for example, two portions to enter the contracting state by the folding of the end portions 31, 31, and hence impairment of the sealing performance of the gland packings 1, 2 can be suppressed.

Also in the case where, after the production of the gland packings 1, 2, the packings are compression-molded to a predetermined size or into an annular shape, or where the packings receive a large fastening force during a sealing process, as a result of the provision of such braiding yarns 10A, the end portions 31, 31 in the width direction of the expanded graphite tape 30 are folded back, and hence it is possible to suppress occurrence and expansion of cracks.

It is a matter of course that, as the number of such braiding yarns 10A in the gland packings 1, 2 is larger, cracks in the end portions 31, 31 in the width direction of the expanded graphite tape 30 exert less influence, and impairment of the sealing performance of the gland packings 1, 2 due to the cracks can be suppressed more effectively.

In the embodiment described above, at least one of the braiding yarns in the gland packings 1, 2 are configured as the braiding yarns 10A. Of course, braiding yarns are not restricted to have the shape of the braiding yarns 10A, and may have, for example, the shapes of the braiding yarns 10A respectively shown in FIG. 6A, FIG. 6B, and FIG. 6C. The manners of bending the expanded graphite tape 30 so as to contract in the width direction, covering the expanded graphite tape 30 by the reinforcing wire member 40, and folding back the end portions 31, 31 in the width direction of the expanded graphite tape 30 may be different from those described above. In summary, the design of the bending, covering, and folding manners can be variously modified without departing from the invention. In the braiding yarns 10A of FIG. 6A, FIG. 6B, and FIG. 6C, portions corresponding to those of the braiding yarns 10A of the above-mentioned embodiment are denoted by the same reference numerals, and their description is omitted.

Figure 8:
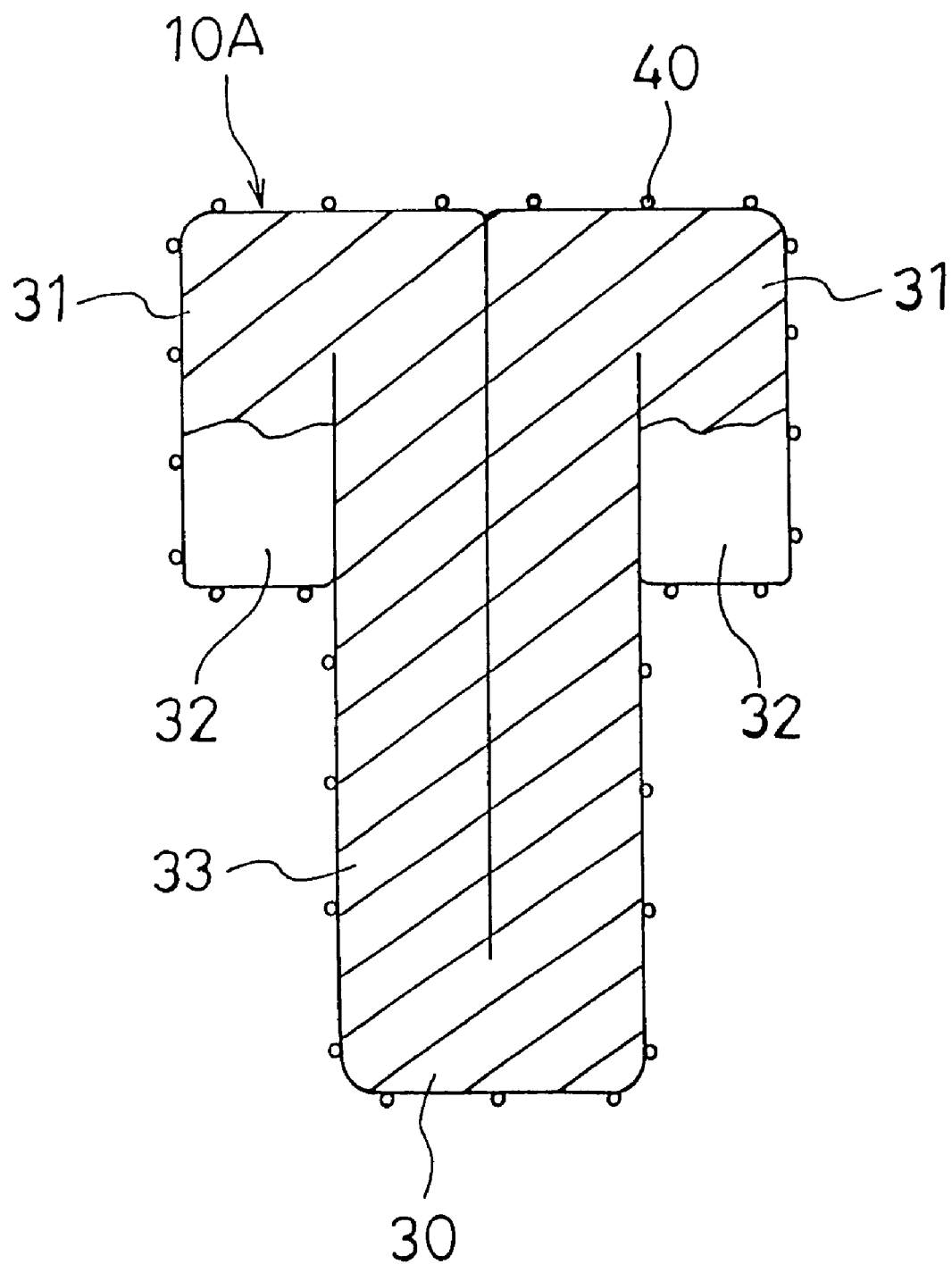
FIG. 8 is a section view showing a still further embodiment of a braiding yarn in the gland packing of the invention.

With respect to the direction of the folding back, the invention is not restricted to the case where the end portions 31, 31 in the width direction of the expanded graphite tape 30 are folded back so as to be directed inside (inner side) the expanded graphite tape 30. As shown as a typical example in FIG. 8, for example, the end portions 31, 31 may be folded back so as to be directed outside the expanded graphite tape 30. The one end portion 31 may be folded back outside the expanded graphite tape 30, and the other end portion 31 may be folded back so as to be directed inside the expanded graphite tape 30. Namely, also the design of the direction of the folding back can be variously modified without departing from the invention.

In the embodiments respectively shown in FIG. 4, FIG. 6, FIG. 7, and FIG. 8, the case where the reinforcing wire member 40 having a cover configured by a knitted body or a braided body is used has been described. The invention is not restricted to this. In place of the reinforcing wire member 40, as shown as typical examples in FIG. 9A and 9B, for example, a braiding yarn 10A employing at least one of reinforcing wire members 41 which are embedded in the expanded graphite tape 30 in the longitudinal direction with forming predetermined gaps, and a reinforcing wire member 42 which is placed between the bent expanded graphite tape 30 in the longitudinal direction, a braiding yarn 10A employing a combination of all of the reinforcing wire member 40 and the reinforcing wire members 41 and 42, or a braiding yarn 10A employing a combination of the reinforcing wire member 40 and one of the reinforcing wire members 41 and 42 may be used.

As the materials of the reinforcing wire members 41 and 42, in the same manner as the reinforcing wire member 40, metal wires such as stainless steel, inconel, and monel, organic fibers such as cotton, rayon, phenol, aramid, PBO, PBI, PTFE, PPS, and PEEK, and inorganic fibers such as carbon fiber, and ceramic fiber can be used. Depending on the situation, the reinforcing wire members 41, 42, and the expanded graphite tape 30 may be fixed to one another via an adhesive agent.

In the embodiments respectively shown in FIG. 4, FIG. 6, FIG. 7, FIG. 8, and FIG. 9, the case of the single expanded graphite tape 30 has been described. Of course, the invention is not restricted the case of a single expanded graphite tape, and may be applied to a case where a plurality of the expanded graphite tapes 30 are stacked together.

Next, a case where, in the braided gland packing 1 and the twisted gland packing 2 which are shown in FIG. 1 and FIG. 2 and which have been described above, braiding yarns constituting the packings are twisted braiding yarns 20 will be described.

Figure 10:
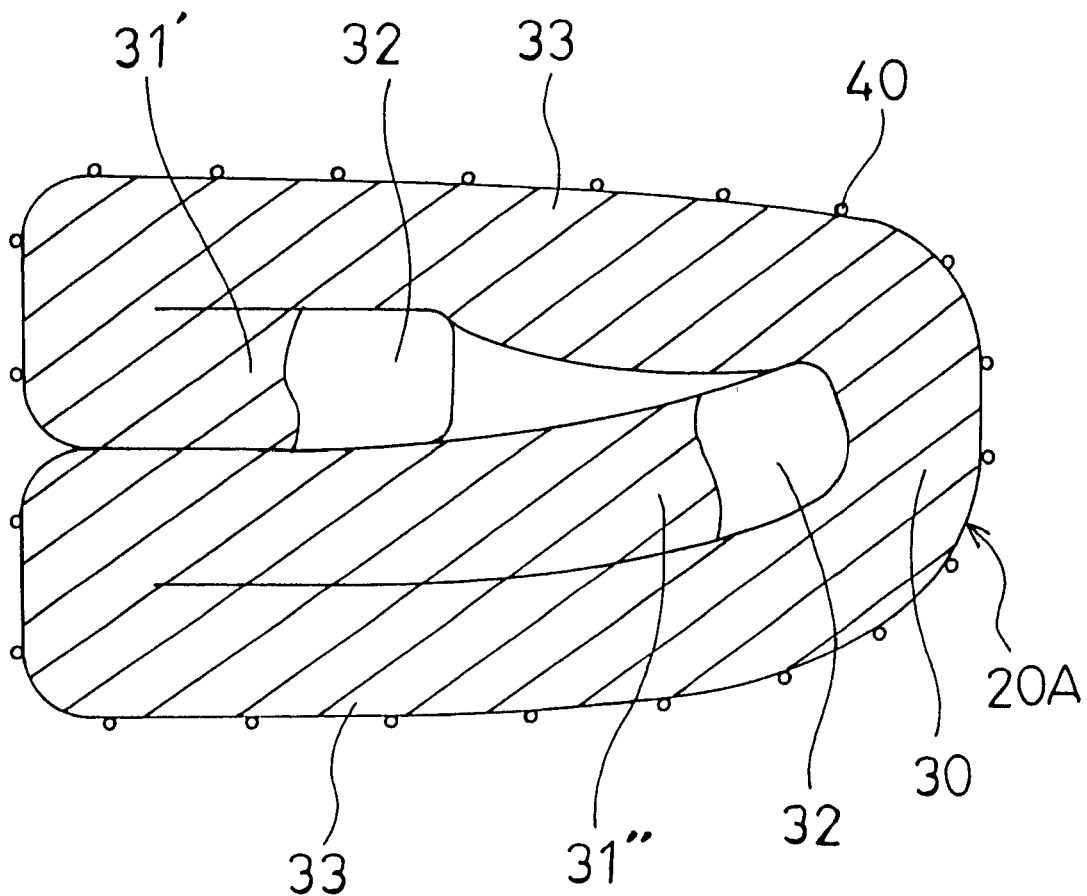
FIG. 10 is a section view showing a still further embodiment of a braiding yarn in the gland packing of the invention.
Figure 11:
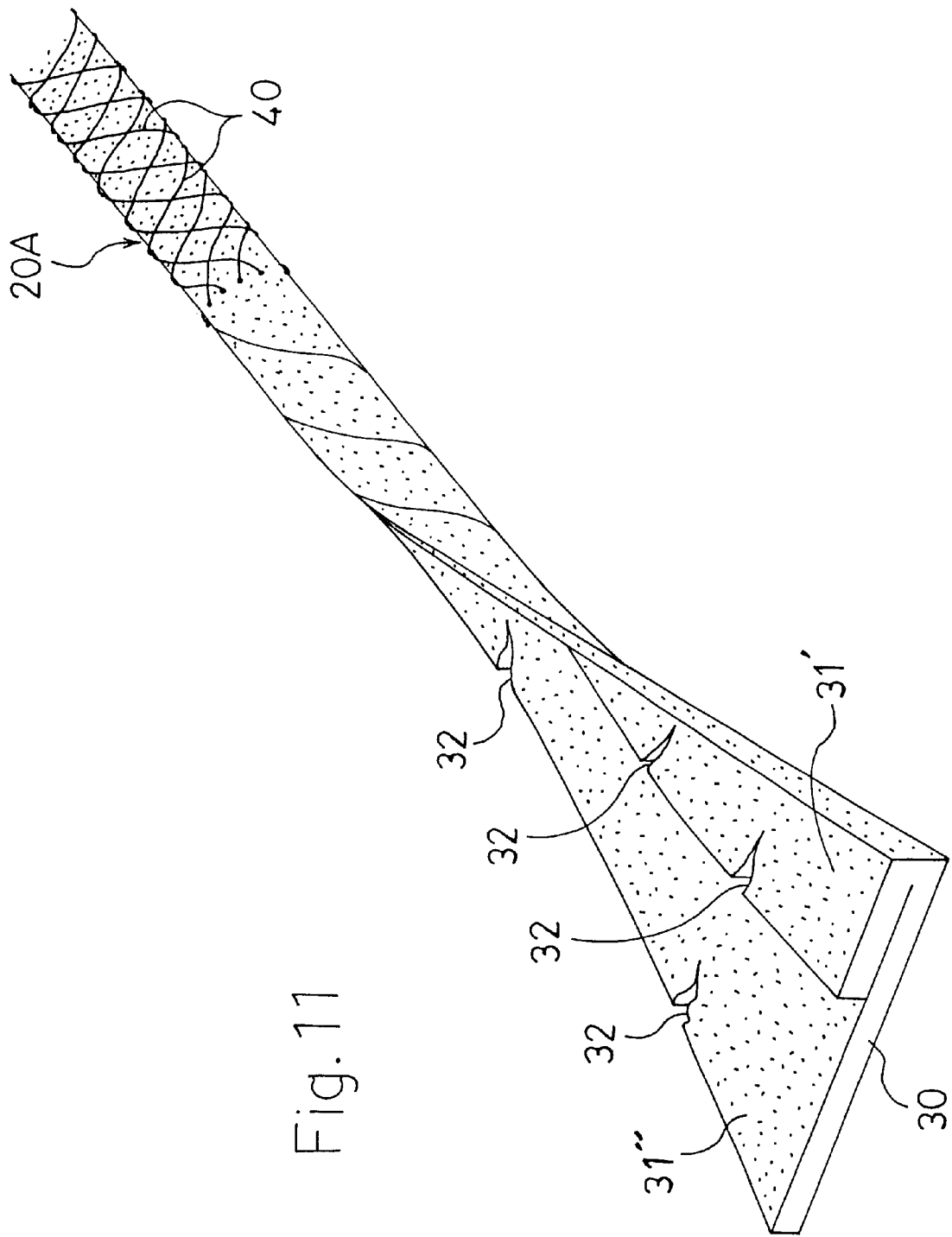
FIG. 11 is a perspective view showing the braiding yarn of FIG. 10 in an untwisted state.

At least one of, preferably a half or more of, and more preferably all of the twisted braiding yarns 20 are configured as braiding yarns 20A in each of which, as shown in FIG. 10, at least an outer end portion 31' in the width direction of the expanded graphite tape 30 is folded back to the inside (inner side), and the whole outer periphery is covered by a reinforcing wire member 40 configured by a knitted body or a braided body. A state where the braiding yarn 20A in the gland packings 1, 2 is untwisted is shown in FIG. 11.

Also as the reinforcing wire member 40 of the braiding yarn 20A, metal wires such as stainless steel, inconel; and monel, organic fibers such as cotton, rayon, phenol, aramid, PBO, PBI, PTFE, PPS, and PEEK, and inorganic fibers such as carbon fiber, and ceramic fiber can be suitably used.

Figure 12:
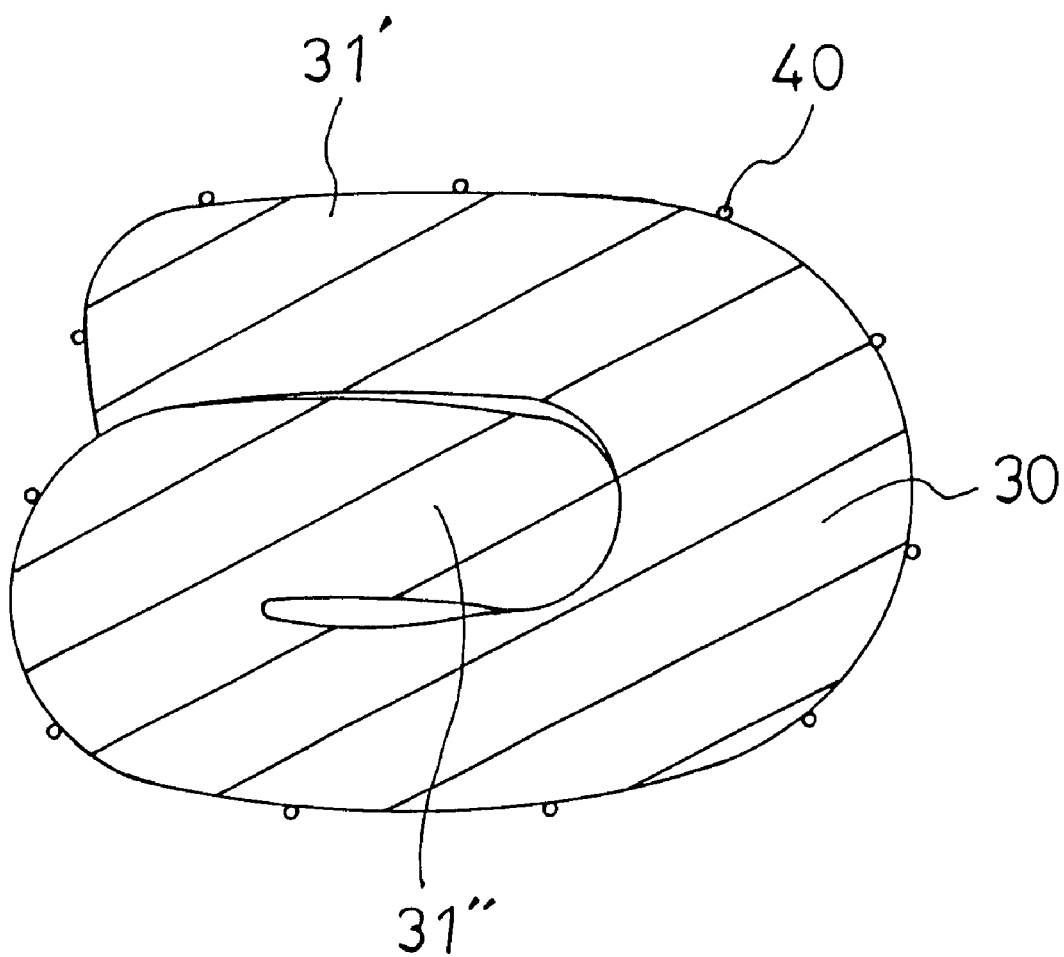
FIG. 12 is a section view showing another embodiment of a braiding yarn which is to be combined with braiding yarns in the gland packing of the invention.

In the gland packings 1, 2, with respect to the braiding yarns which are not configured as the braiding yarns 20A, adequate braiding yarns which use expanded graphite or an expanded graphite tape may be used. As shown in FIG. 12, for example, a braiding yarn in which the expanded graphite tape 30 of a predetermined width is twisted, and the whole outer periphery of the expanded graphite tape is covered by the reinforcing wire member 40 configured by a knitted body or a braided body is preferably used because the yarn is of the same type.

In the case where such braiding yarns 20A are included in the braided gland packing 1 or the twisted gland packing 2, even when, as shown in FIG. 10, cracks 32, 32 occur in the end portions 31', 31' in the width direction of the expanded graphite tape 30, there arises a state where the cracks 32, 32 are in (inside) the twisted expanded graphite tape 30 and are opposed to the outer side piece portions 33. As compared with the case where all the cracks 32, 32 are straightly exposed to the outside, impairment of the sealing performance of the gland packings 1, 2 can be suppressed.

Also in the case where crack 32 in the outer end portion 31' of the expanded graphite tape 30 is so large that the crack is passed through the outer end portion 31' to reach the outer side piece portion 33, the crack 32 is broken into, for example, two portions to enter the contracting state by the folding of the outer end portion 31', and hence impairment of the sealing performance of the gland packings 1, 2 can be suppressed.

Also in the case where, after the production of the gland packings 1, 2, the packings are compression-molded to a predetermined size or into an annular shape, or where the packings receive a large fastening force during a sealing process, as a result of the provision of such a braiding yarn 20A, the outer end portion 31' of the expanded graphite tape 30 is folded back, and hence it is possible to suppress occurrence and expansion of cracks.

It is a matter of course that, as the number of such braiding yarns 20A in the gland packings 1, 2 is larger, cracks in the outer end portion 31' in the width direction of the expanded graphite tape 30 exerts less influence, and impairment of the sealing performance of the gland packings 1, 2 due to the cracks can be suppressed more effectively.

Figure 13:
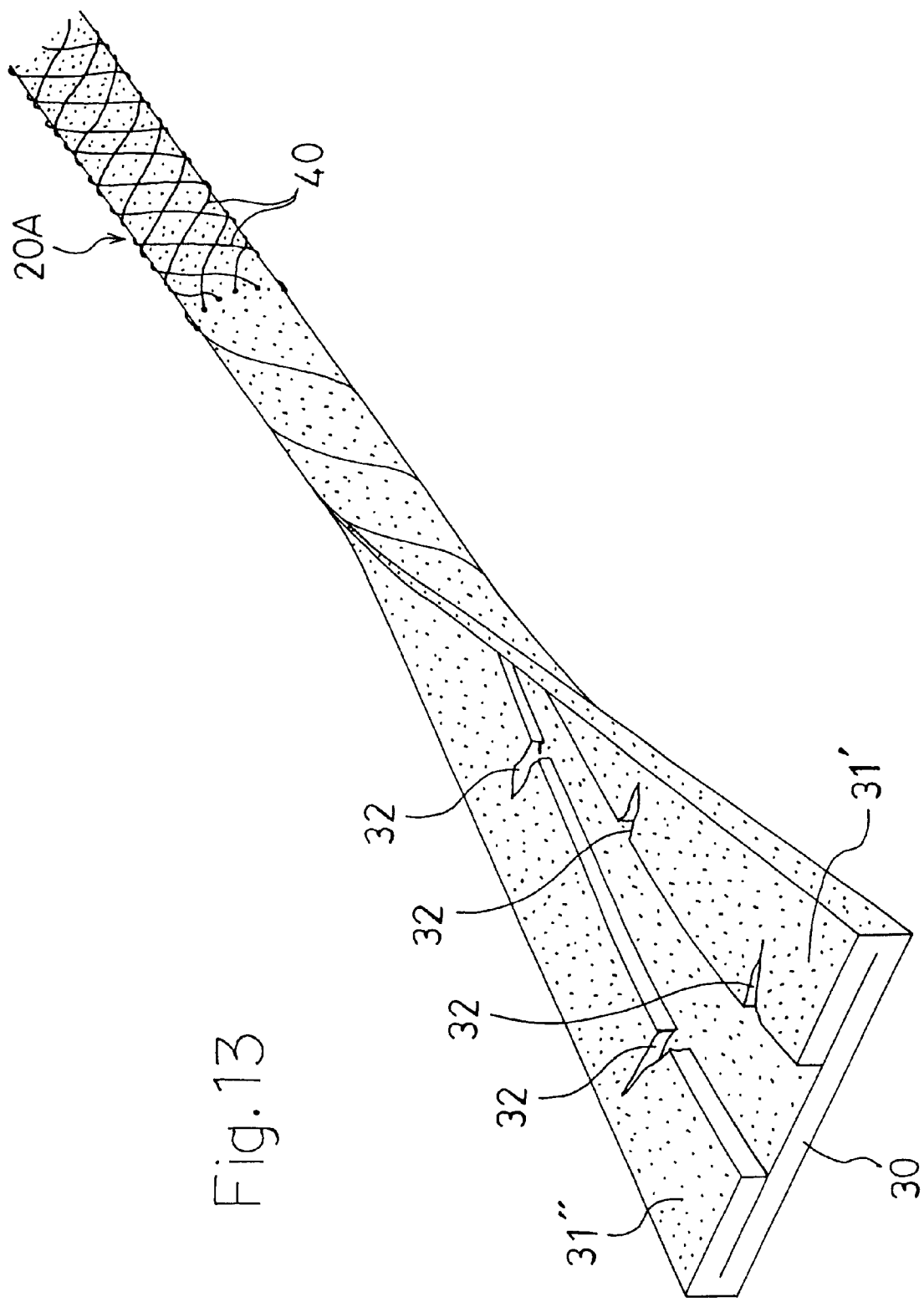
FIG. 13 is a perspective view showing a braiding yarn in an untwisted state in a gland packing of another embodiment of the invention.

In the embodiment described above, at least one of the braiding yarns in the gland packings 1, 2 are configured as the braiding yarns 20A. Of course, braiding yarns are not restricted to have the shape of the braiding yarns 20A, and may have, for example, a shape in which both the outer end portion 31' and the inner end portion 31" in the width direction of the expanded graphite tape 30 are inward folded back as shown in FIG. 13 indicating the braiding yarn 20A in the gland packings 1, 2 in an untwisted state. Although not shown, alternatively, both the end portions may be outward folded back, or the end portions may be folded back in opposite directions.

Figure 14:
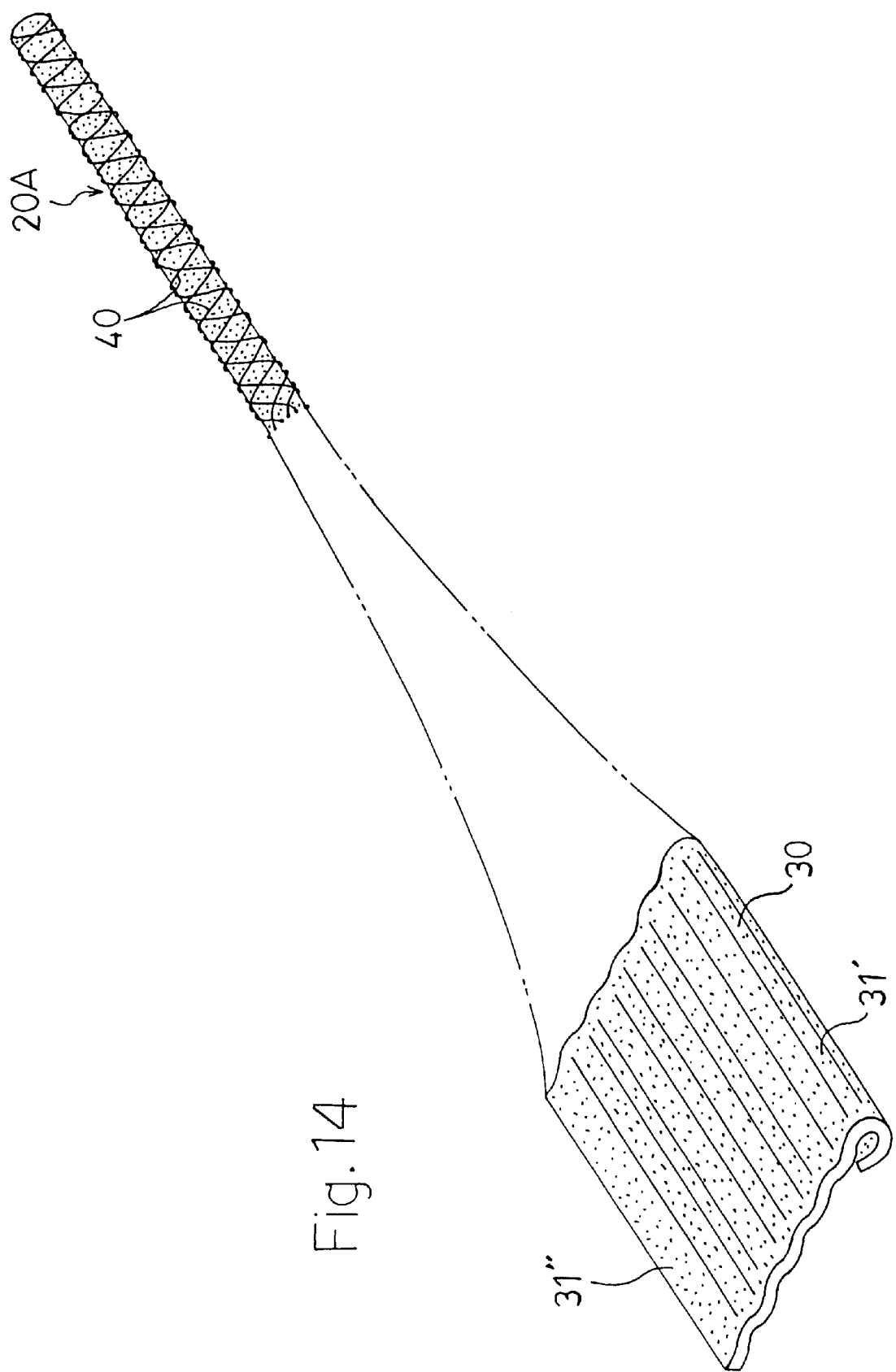
FIG. 14 is a perspective view showing a braiding yarn in an untwisted state in a gland packing of a further embodiment of the invention.
Figure 15:
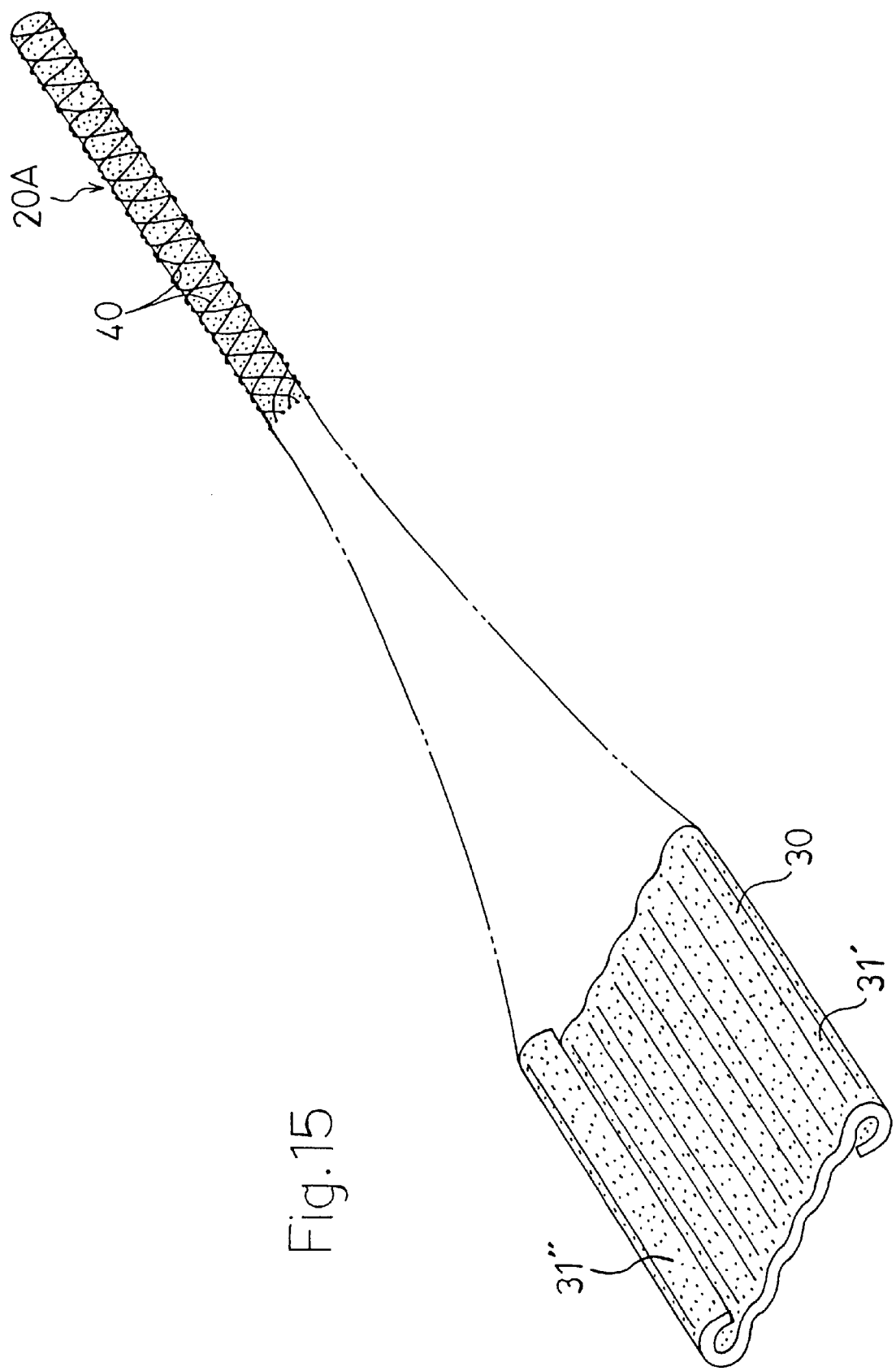
FIG. 15 is a perspective view showing a braiding yarn in an untwisted state in a gland packing of a still further embodiment of the invention.

In the case where the width of the expanded graphite tape 30 is set to be wide, as shown in FIG. 14 indicating the braiding yarn 20A in the gland packings 1, 2 in an untwisted state, at least the outer end portion 31' in the width direction of the expanded graphite tape 30 may be folded back, and the width direction may be bent or folded so as to contract, or, as shown in FIG. 15, both the end portions 31', 31" in the width direction of the expanded graphite tape 30 may be folded back in opposite directions, and the width direction may be bent or folded so as to contract.

Figure 16:
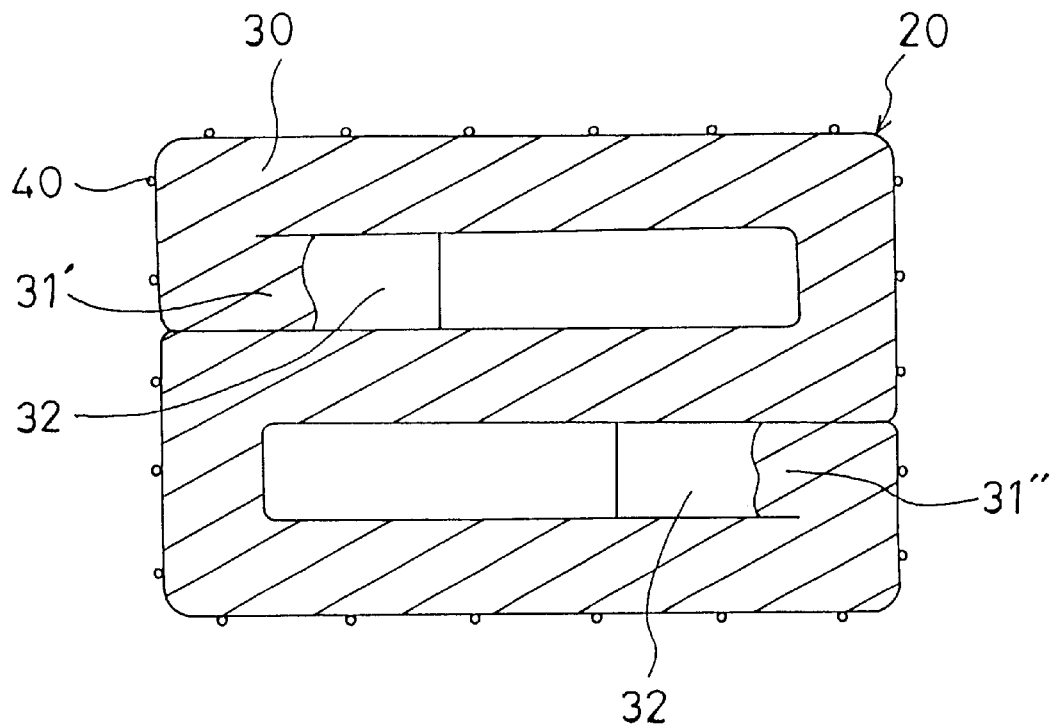
FIG. 16 is a section view showing another modification of a braiding yarn in the gland packing of the invention.
Figure 17:
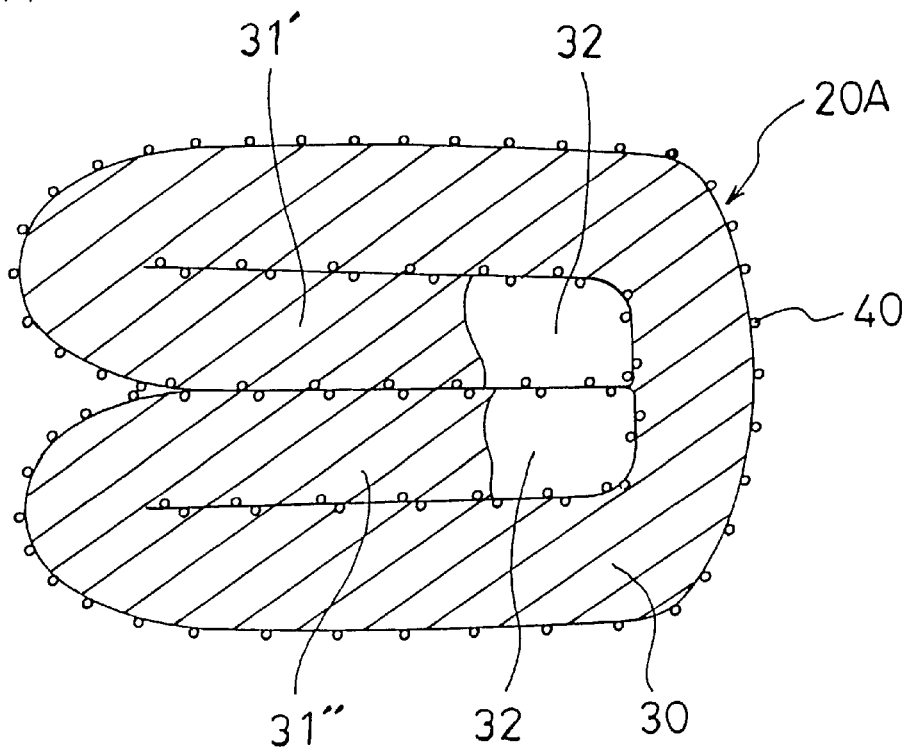
FIG. 17 is a section view showing a further modification of a braiding yarn in the gland packing of the invention.

The folding mode may be as shown in FIG. 16 indicating the section state of the braiding yarn 20A in the gland packings 1, 2. The manner of covering the expanded graphite tape 30 by the reinforcing wire member 40 may be realized by a covering mode in which the reinforcing wire member 40 is interposed between folded faces of the expanded graphite tape 30.

Namely, the manner of covering the expanded graphite tape 30 by the reinforcing wire member 40, and the manner and the direction of folding back both the end portions 31, 31 in the width direction of the expanded graphite tape 30 are not restricted to those of the embodiments described above, and their design can be variously modified without departing from the invention.

Figure 18:
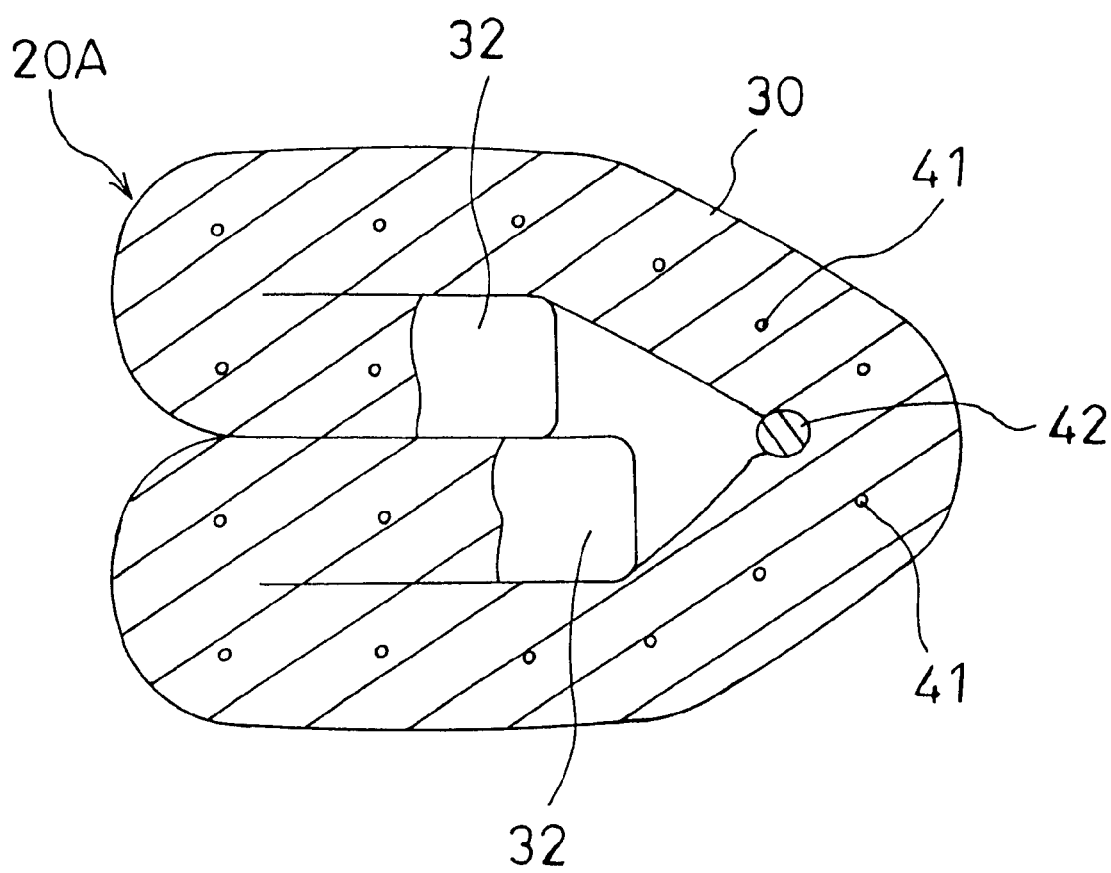
FIG. 18 is a section view showing a still further modification of a braiding yarn in the gland packing of the invention.

In the embodiments respectively exemplarily shown in FIG. 10, FIG. 13, FIG. 14, FIG. 15, FIG. 16, and FIG. 17, the case where the reinforcing wire member 40 having a cover configured by a knitted body or a braided body is used has been described. The invention is not restricted to this. In place of the reinforcing wire member 40, as shown as a typical example in FIG. 18, for example, a braiding yarn 20A employing at least one of reinforcing wire members 41 which are embedded in the expanded graphite tape 30 in the longitudinal direction with forming predetermined gaps, and a reinforcing wire member 42 which is placed between the bent expanded graphite tape 30 in the longitudinal direction may be used. Alternatively, a braiding yarn 20A employing a combination of all of the reinforcing wire member 40 and the reinforcing wire members 41 and 42, or a braiding yarn 20A employing a combination of the reinforcing wire member 40 and one of the reinforcing wire members 41 and 42 may be used.

It is a matter of course that, as the materials of the reinforcing wire members 41 and 42, as described above, metal wires such as stainless steel, inconel, and monel, organic fibers such as cotton, rayon, phenol, aramid, PBO, PBI, PTFE, PPS, and PEEK, and inorganic fibers such as carbon fiber, and ceramic fiber can be used. It is a matter of course that, depending on the situation, the reinforcing wire members 41, 42, and the expanded graphite tape 30 may be fixed to one another via an adhesive agent.

In the embodiments exemplarily shown in FIG. 10, FIG. 13, FIG. 14, FIG. 15, FIG. 16, and FIG. 17, the case of the single expanded graphite tape 30 has been described. Of course, the invention may be implemented in a case where a plurality of the expanded graphite tapes 30 are stacked together.

In all of the above-mentioned embodiments, the gland packing is not restricted to the braided gland packing 1 and the twisted gland packing 2 which are exemplarily shown in FIG. 1 and FIG. 2. The invention can be applied to various kinds of braided or twisted gland packings which have a core or do not have a core. The timing of forming the braiding yarns in a gland packing which are characteristic to the invention is not restricted to that before the braiding or twisting process, and may be during the braiding or twisting process. In some cases, it is desired to suppress occurrence and expansion of cracks in an end portion in the width direction of the expanded graphite tape 30 as a result of application of a large fastening force when the gland packing is compression-molded to a predetermined size or into an annular shape at a latter timing, or when the gland packing is set to an apparatus. In the cases, the folding is caused to be completed when the compression force acts on the gland packing, whereby occurrence and expansion of cracks can be suppressed.

INDUSTRIAL APPLICABILITY

The gland packing of the invention has an advantage that a disadvantageous situation that the sealing performance of the gland packing is impaired by cracks which are occurring or will occur in an end portion in the width direction of an expanded graphite tape can be suppressed and the gland packing can exert stable sealing performance of high reliability.

What is claimed is:

1. A gland packing wherein a plurality of braiding yarns in a braided gland packing include at least one braiding yarn in which an expanded graphite tape is bent into a valley fold to contract in a width direction, and both end portions in the width direction of said bent expanded graphite tape are folded back so as to be directed toward the inner side in the width direction thereof.

2. A gland packing wherein a plurality of braiding yarns in a twisted gland packing include at least one braiding yarn in which an expanded graphite tape is bent into a valley fold to contract in a width direction, and both end portions in the width direction of said bent expanded graphite tape are folded back so as to be directed toward the inner side in the width direction thereof.

3. A gland packing wherein a plurality of braiding yarns in a braided gland packing include at least one braiding yarn in which an expanded graphite tape is twisted, and both end portions in a width direction of said twisted expanded graphite tape are folded back.

4. A gland packing wherein a plurality of braiding yarns in a twisted gland packing include at least one braiding yarn in which an expanded graphite tape is twisted, and both end portions in a width direction of said twisted expanded graphite tape are folded back.

* * * * *

UNITED STATES PATENT AND TRADEMARK OFFICE
CERTIFICATE OF CORRECTION

PATENT NO. : 6,568,689 B1
DATED : May 27, 2003
INVENTOR(S) : Masaru Fujiwara et al.

It is certified that error appears in the above-identified patent and that said Letters Patent is hereby corrected as shown below:

Column 8,
Line 5, -- so as to be directed toward the inner side in the width direction thereof -- should be inserted between "back" and the ".".

Signed and Sealed this

Nineteenth Day of August, 2003

JAMES E. ROGAN
*Director of the United States Patent and Trademark Office*